United States Patent
Eaton et al.

(10) Patent No.: US 7,018,500 B2
(45) Date of Patent: Mar. 28, 2006

(54) APPARATUS AND METHOD FOR SINGULATING POROUS FUEL CELL LAYERS USING ADHESIVE TAPE PICK HEAD

(75) Inventors: Warren David Eaton, White Bear Township, MN (US); Gary William Schukar, North Oaks, MN (US); John Russell Mlinar, Coon Rapids, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/980,010

(22) Filed: Nov. 3, 2004

(65) Prior Publication Data

US 2005/0194102 A1    Sep. 8, 2005

Related U.S. Application Data

(62) Division of application No. 10/115,556, filed on Apr. 3, 2002.

(51) Int. Cl.
*B32B 31/00* (2006.01)

(52) U.S. Cl. .............. 156/247; 156/570; 156/573; 156/584

(58) Field of Classification Search .............. 156/247, 156/344, 564, 570, 573, 584, DIG. 29, DIG. 30, 156/DIG. 31
See application file for complete search history.

(56) References Cited

U.S. PATENT DOCUMENTS

| | | |
|---|---|---|
| 2,710,234 A | 6/1955 | Hansen |
| 3,178,041 A | 4/1965 | Wheat et al. |
| 3,285,112 A | 11/1966 | Dale et al. |
| 3,359,046 A | 12/1967 | Dryden |
| 3,380,788 A | 4/1968 | Wilcock |
| 3,477,558 A | 11/1969 | Fleischauer |
| 3,539,177 A | 11/1970 | Schwenk et al. |
| 3,861,259 A | 1/1975 | Hitch |
| 3,946,920 A | 3/1976 | Jordan et al. |

(Continued)

FOREIGN PATENT DOCUMENTS

AT    314 323 B    3/1974

(Continued)

OTHER PUBLICATIONS

U.S. Appl. No. 10/446,485, filed May 28, 2003, Roll-Good Fuel Cell Fabrication Processes, Equipment, and Articles Produced From Same (58669US002, David R. Mekala et al., pp. 1-55, 16 sheets drawings).

(Continued)

*Primary Examiner*—Mark A Osele
(74) *Attorney, Agent, or Firm*—Mark A. Hollingsworth; Philip Y. Dahl

(57) ABSTRACT

An apparatus and method provide for singulating thin and substantially porous material layers arranged in a stack. A pick head is positioned above the stack of material layers. An adhesive tape is stabilized against the pick head through use of a vacuum between the adhesive tape and the pick head. Contact is effected between the stabilized adhesive tape and the top material layer. The pick head is moved to move the top material layer from the stack to a predetermined location. While at the predetermined location, the adhesive tape is detached from the top material layer. The singulation apparatus and method are particularly well suited for destacking individual porous fluid transport layers (FTLs) from a magazine of FTLs during automated fuel cell assembly.

22 Claims, 7 Drawing Sheets

U.S. PATENT DOCUMENTS

| | | | |
|---|---|---|---|
| 4,112,827 A | | 9/1978 | Kang |
| 4,143,871 A | | 3/1979 | Blessing |
| 4,168,772 A | | 9/1979 | Eberle |
| 4,236,814 A | | 12/1980 | Tonkin |
| 4,286,467 A | | 9/1981 | Köber |
| 4,360,260 A | | 11/1982 | Eloranta et al. |
| 4,381,596 A | | 5/1983 | Simonton et al. |
| 4,428,793 A | * | 1/1984 | Sato et al. .................. 156/285 |
| 4,534,549 A | | 8/1985 | Eberle |
| 4,591,139 A | | 5/1986 | Engelbart |
| 4,668,324 A | | 5/1987 | Burns |
| 4,676,862 A | | 6/1987 | Kuehnert |
| 4,728,093 A | | 3/1988 | Eberle |
| 4,784,380 A | | 11/1988 | Eberle |
| 4,819,928 A | | 4/1989 | Osborn et al. |
| 4,887,858 A | | 12/1989 | Gazzarrini |
| 5,031,002 A | | 7/1991 | Yaguchi |
| 5,048,182 A | | 9/1991 | Robbins, III |
| 5,061,337 A | | 10/1991 | Fraser |
| 5,063,415 A | | 11/1991 | Ariyama |
| 5,078,375 A | | 1/1992 | Steidinger |
| 5,133,543 A | | 7/1992 | Eitel et al. |
| 5,140,872 A | | 8/1992 | Holliday et al. |
| 5,456,871 A | | 10/1995 | Harada et al. |
| 5,556,499 A | | 9/1996 | Clough |
| 5,588,967 A | | 12/1996 | Lemp et al. |
| 5,596,897 A | | 1/1997 | Payne, Jr. et al. |
| 5,761,793 A | | 6/1998 | Bevers et al. |
| 5,762,753 A | | 6/1998 | Clough |
| 5,783,024 A | | 7/1998 | Forkert |
| 5,791,185 A | | 8/1998 | Bodnar |
| 5,910,378 A | | 6/1999 | Debe et al. |
| 5,989,386 A | * | 11/1999 | Elliott ........................ 156/344 |
| 5,989,747 A | | 11/1999 | Tanaka et al. |
| 6,007,660 A | | 12/1999 | Forkert |
| 6,059,003 A | | 5/2000 | Wittkopf |
| 6,066,409 A | | 5/2000 | Ronne et al. |
| 6,159,327 A | | 12/2000 | Forkert |
| 6,224,203 B1 | | 5/2001 | Wotton et al. |
| 6,241,839 B1 | | 6/2001 | Yoshino et al. |
| RE37,366 E | | 9/2001 | Cox et al. |
| 6,347,585 B1 | | 2/2002 | Kiamco et al. |
| 6,405,779 B1 | | 6/2002 | Wittkopf |
| 6,419,217 B1 | | 7/2002 | Hartmann et al. |
| 6,500,217 B1 | | 12/2002 | Starz et al. |
| 6,547,229 B1 | | 4/2003 | Hanson et al. |
| 6,585,846 B1 | | 7/2003 | Hanson et al. |
| 6,733,912 B1 | | 5/2004 | Mlinar |
| 6,740,131 B1 | | 5/2004 | Schukar et al. |
| 6,742,561 B1 | * | 6/2004 | Nam et al. .................. 156/521 |
| 6,749,713 B1 | | 6/2004 | Mlinar |
| 6,756,146 B1 | | 6/2004 | Mlinar et al. |
| 6,780,276 B1 | | 8/2004 | Ripley |
| 6,796,353 B1 | * | 9/2004 | Lang et al. .................. 156/556 |
| 2002/0014509 A1 | | 2/2002 | Kitai et al. |
| 2002/0050200 A1 | | 5/2002 | Matsumoto et al. |
| 2002/0134501 A1 | | 9/2002 | Fan et al. |
| 2002/0136940 A1 | | 9/2002 | Mao et al. |
| 2003/0145697 A1 | | 8/2003 | Hixon et al. |
| 2003/0188615 A1 | | 10/2003 | Ripley |
| 2003/0188616 A1 | | 10/2003 | Behymer |
| 2003/0188824 A1 | | 10/2003 | Hirsch |
| 2003/0190226 A1 | | 10/2003 | Eaton et al. |
| 2003/0191021 A1 | | 10/2003 | Ripley et al. |
| 2003/0221311 A1 | | 12/2003 | Smith et al. |

FOREIGN PATENT DOCUMENTS

| | | |
|---|---|---|
| BE | 1007774 A3 | 10/1995 |
| DE | 19 28 110 A | 12/1970 |
| DE | 26 10 628 A | 9/1977 |
| DE | 33 43 811 A1 | 6/1985 |
| DE | 94 00 890.6 U1 | 3/1994 |
| DE | 195 48 422 A1 | 9/1997 |
| EP | 0 654 347 A1 | 5/1995 |
| EP | 1 037 295 A1 | 9/2000 |
| EP | 1 473 793 A2 | 11/2004 |
| FR | 2 456 613 A | 12/1980 |
| GB | 1 084 597 A | 9/1967 |
| GB | 2 101 098 A | 1/1983 |
| JP | 55-98040 | 7/1980 |
| JP | 57-93854 | 6/1982 |
| JP | 62-244830 | 10/1987 |
| JP | 03-128851 | 5/1991 |
| JP | 03-128853 | 5/1991 |
| JP | 96335462 A | 12/1996 |
| JP | 10-166014 | 6/1998 |
| JP | 11 273663 A | 10/1999 |
| JP | 11 297314 A | 10/1999 |
| JP | 99292327 A | 10/1999 |
| JP | 2001/236971 | 8/2001 |
| NL | 6 415 053 A | 6/1966 |
| WO | WO 02/43171 A2 | 5/2002 |
| WO | WO 02/43179 A1 | 5/2002 |

OTHER PUBLICATIONS

Monkman, G. J.; "Robot Grippers for Use With Fibrous Materials", *International Journal of Robotics Research*, Sage Science Press, Thousand Oaks, vol. 14, No. 2, Apr. 1, 1995, pp. 144-151.

Ferris, T. L. J., "Design of Two Ultrasonic Distance Measurement System", *The First Japanese-Australian Joint Seminar*, Mar. 16-17, 2000.

* cited by examiner

APPARATUS AND METHOD FOR SINGULATING POROUS FUEL CELL LAYERS USING ADHESIVE TAPE PICK HEAD

CROSS REFERENCE TO RELATED APPLICATION

This application is a divisional of U.S. Ser. No. 10/115,556, filed Apr. 3, 2002, now allowed, the disclosure of which is herein incorporated by reference.

FIELD OF THE INVENTION

The present invention relates generally to manufacturing pick and place devices and, more particularly, to an apparatus and method for singulating porous layers of a fuel cell using an adhesive tape pick head assembly.

BACKGROUND OF THE INVENTION

Various apparatuses have been developed to destack items from a magazine of such items in an automated fashion. Conventional destacking apparatuses typically employ suction cups or a vacuum to releasably engage and transport layers of a given material during a destacking operation. Although such conventional arrangements may be satisfactory in certain applications, implementing known approaches for destacking relatively thin materials having varying porosity renders conventional arrangements unworkable.

Moreover, it is often desirable to automate, either partially or completely, a number of processes of a destacking operation. Many conventional material handling and destacking apparatuses and methods are not well suited for a high degree of automation, particularly destacking processes which have tight positional tolerance requirements.

There is a need for improved material layer destacking apparatuses and methodologies. There is a further need for such apparatuses and methodologies that can safely and precisely position destacked material layers of varying porosity in an automated assembly environment, such as in an automated fuel cell assembly plant. The present invention fulfills these and other needs.

SUMMARY OF THE INVENTION

The present invention is directed to an apparatus and method of singulating thin and substantially porous material layers arranged in a stack. According to a method of the present invention, a pick head is positioned above the stack of material layers. An adhesive tape is stabilized against the pick head through use of a vacuum between the adhesive tape and the pick head. Contact is effected between the stabilized adhesive tape and the top material layer of the stack. The pick head is moved so as to move the top material layer from the stack to a predetermined location. While at the predetermined location, the adhesive tape is detached from the top material layer.

An apparatus of the present invention provides for singulating porous material layers arranged in a stack. The apparatus includes a pick head comprising a pick region, a stripper mechanism situated proximate the pick region, and a vacuum port located at the pick region. The vacuum port is adapted for coupling to a vacuum system. A tape drive mechanism is employed to control movement of an adhesive tape proximate the vacuum port at the pick region. A positioning system supports the pick head, and is controllable to move the pick head vertically and horizontally.

A controller is programmed to control the positioning system to move the pick head so that the adhesive tape contacts the top porous material layer. The adhesive tape is stabilized at the pick region by a vacuum between the adhesive tape and the pick region. The controller is programmed to further control the positioning system to move the pick head to a predetermined location. At the predetermined location, the stripper mechanism actuates to detach the top porous material layer from the adhesive tape. The controller is programmed to effect repeated singulation of the porous material layers from the stack. The singulation processes are repeated for subsequent material layers at the top of the stack. The singulation apparatus and method are particularly well suited for destacking individual porous fluid transport layers (FTLs) from a magazine of FTLs during automated fuel cell assembly.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 4c is a side view of the linkage assembly partially shown in FIG. 4a;

FIG. 4d is a rear view of the linkage assembly partially shown in FIG. 4a;

FIG. 5c is a side view of the unwind assembly partially shown in FIG. 5a; and

FIG. 5d is a rear view of the unwind assembly partially shown in FIG. 5a.

Figure 1:
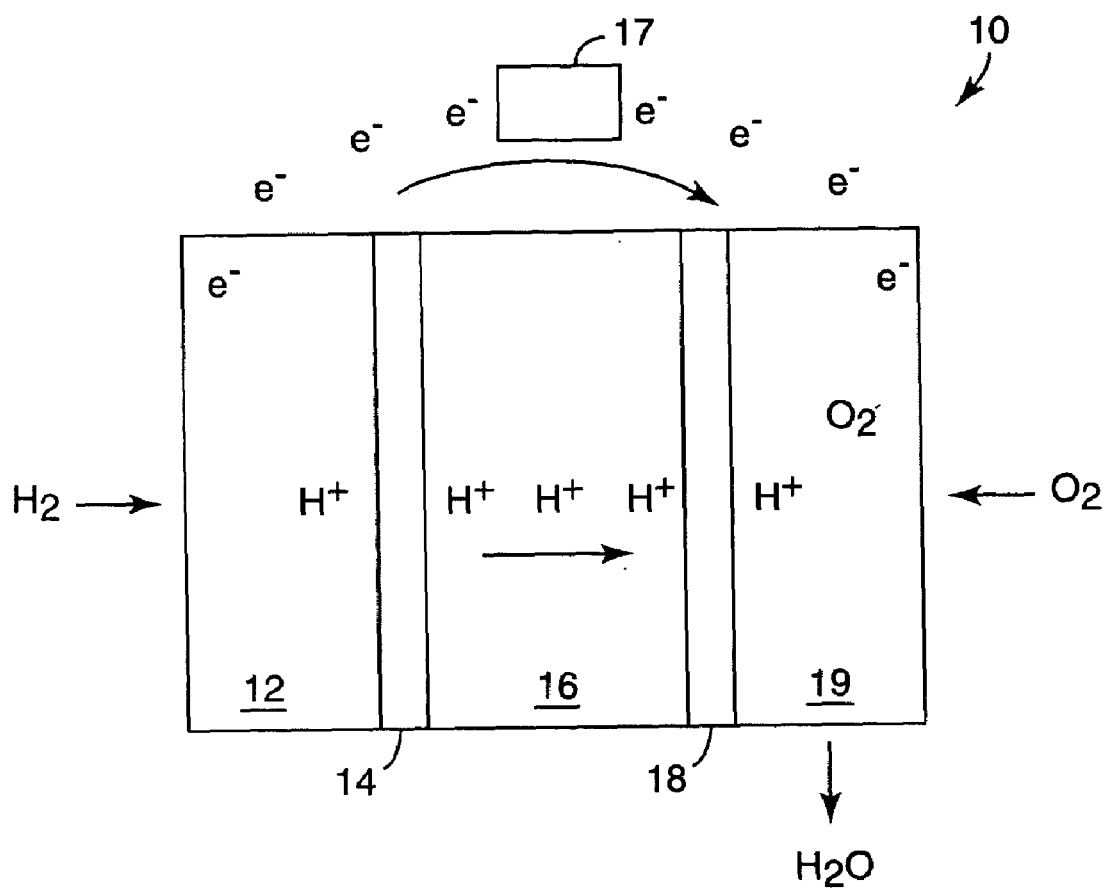
FIG. 1 is an illustration of a fuel cell and its constituent layers.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

A singulation apparatus and methodology of the present invention can be employed to singulate individual layers of relatively thin material and to move singulated thin material layers to a predetermined location with high precision. In particular, a singulation apparatus and methodology of the present invention is well suited for destacking individual thin material layers which are substantially porous. For example, certain material layers used to construct a fuel cell can have a thickness of one or two thousandths of an inch (e.g., about 0.001 inches). These material layers can be porous and, in addition, may be brittle. One skilled in the art will readily appreciate that destacking and transporting relatively thin layers of material, particularly porous and brittle material layers, both accurately and safely is a significant challenge. These challenges are presently facing those attempting to automate the process of fabricating fuel cells.

A singulation apparatus and methodology of the present invention provides for the safe and precise singulation of thin, porous material layers during automated processing of such material layers. Moreover, principles of the present invention may also be applied to singulate and accurately position non-porous material layers during automated processing of such material layers.

As indicated above, a singulation apparatus and methodology of the present invention can be employed to facilitate automated singulation and positioning of material layers defining a fuel cell or a portion of a fuel cell. A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

A typical fuel cell is depicted in FIG. 1. The fuel cell 10 shown in FIG. 1 includes a first fluid transport layer 12 adjacent an anode 14. Adjacent the anode 14 is an electrolyte membrane 16. A cathode 18 is situated adjacent the electrolyte membrane 16, and a second fluid transport layer 19 is situated adjacent the cathode 18. In operation, hydrogen fuel is introduced into the anode portion of the fuel cell 10, passing through the first fluid transport layer 12 and over the anode 14. At the anode 14, the hydrogen fuel is separated into hydrogen ions ($H^+$) and electrons ($e^-$).

The electrolyte membrane 16 permits only the hydrogen ions or protons to pass through the electrolyte membrane 16 to the cathode portion of the fuel cell 10. The electrons cannot pass through the electrolyte membrane 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second fluid transport layer 19. As the oxygen passes over the cathode 18, oxygen, protons, and electrons combine to produce water and heat.

Individual fuel cells, such as that shown in FIG. 1, can be combined with a number of other fuel cells to form a fuel cell stack. The number of fuel cells within the stack determines the total voltage of the stack, and the surface area of each of the cells determines the total current. The total electrical power generated by a given fuel cell stack can be determined by multiplying the total stack voltage by total current.

A singulation apparatus and methodology of the present invention can be employed to facilitate automated destacking and positioning of material layers in the construction of fuel cells of varying technologies. For example, a singulation apparatus and methodology of the present invention can be employed to singulate material layers used to construct proton exchange membrane (PEM) fuel cells. PEM fuel cells operate at relatively low temperatures (about 175 degrees F.), have high power density, can vary their output quickly to meet shifts in power demand, and are well suited for applications where quick startup is required, such as in automobiles for example.

The proton exchange membrane used in a PEM fuel cell is a thin plastic sheet that allows hydrogen ions to pass through it. The membrane is coated on both sides with highly dispersed metal or metal alloy particles (e.g., platinum or platinum/ruthenium) that are active catalysts. The electrolyte used is typically a solid organic polymer polyperfluorosulfonic acid. Use of a solid electrolyte is advantageous because it reduces corrosion and management problems.

Hydrogen is fed to the anode side of the fuel cell where the catalyst encourages the hydrogen ions to release electrons and become hydrogen ions (protons). The electrons travel in the form of an electric current that can be utilized before it returns to the cathode side of the fuel cell where oxygen has been introduced. At the same time, the protons diffuse through the membrane to the cathode, where the hydrogen ions are recombined and reacted with oxygen to produce water.

According to one PEM fuel cell construction, a PEM layer is sandwiched between a pair of fluid transport layers, such as diffuse current collectors or gas diffusion layers for example. An anode is situated between a first FTL and the membrane, and a cathode is situated between the membrane and a second FTL. In one configuration, a PEM layer is fabricated to include an anode catalyst coating on one surface and a cathode catalyst coating on the other surface. According to another configuration, the first and second FTLs are fabricated to include an anode and cathode catalyst coating, respectively. In yet another configuration, an anode catalyst coating can be disposed partially on the first FTL and partially on one surface of the PEM, and a cathode catalyst coating can be disposed partially on the second FTL and partially on the other surface of the PEM. The five layer construct defined by the first FTL/anode/PEM/cathode/second FTL is referred to as a membrane electrode assembly (MEA).

The FTLs are typically fabricated from a carbon fiber paper or non-woven material. Depending on the product construction, the FTLs can have carbon particle coatings on one side. The FTLs, as discussed above, can be fabricated to include or exclude a catalyst coating. The FTLs, according to this product construction, are both porous and brittle. A singulation apparatus and methodology consistent with the principles of the present invention is particularly well suited for destacking and positioning thin fuel cell layers, such as PEM layers and FTLs for example, during automated fuel cell assembly.

Direct methanol fuel cells (DMFC) are similar to PEM cells in that they both use a polymer membrane as the electrolyte. In a DMFC, however, the anode catalyst itself draws the hydrogen from liquid methanol fuel, eliminating the need for a fuel reformer. DMFCs typically operate at a temperature between 120–190 degrees F.

Molten carbonate fuel cells (MCFC) use a liquid solution of lithium, sodium and/or potassium carbonates, soaked in a matrix for an electrolyte. MCFCs operate at about 1,200 degrees F. The high operating temperature is needed to achieve sufficient conductivity of the electrolyte. Because of this high temperature, noble metal catalysts are not required for the cell's electrochemical oxidation and reduction processes. MCFCs are typically operated on hydrogen, carbon monoxide, natural gas, propane, landfill gas, marine diesel, and simulated coal gasification products.

A solid oxide fuel cell (SOFC) typically employs a hard ceramic material of solid zirconium oxide and a small amount of ytrria, instead of a liquid electrolyte, allowing operating temperatures to reach 1,800 degrees F.

In regenerative fuel cells, water is separated into hydrogen and oxygen by a solar-powered electrolyser. The hydrogen and oxygen are fed into the regenerative fuel cell which generates electricity, heat, and water. The water is then recirculated back to the solar-powered electrolyser and the process is repeated.

A protonic ceramic fuel cell (PCFC) employs a ceramic electrolyte material that exhibits high protonic conductivity at elevated temperatures. PCFCs operate at about 1,300 degrees F. PCFCs can operate at high temperatures and electrochemically oxidize fossil fuels directly to the anode. Gaseous molecules of the hydrocarbon fuel are absorbed on the surface of the anode in the presence of water vapor, and hydrogen ions are efficiently stripped off to be absorbed into the electrolyte, with carbon dioxide as the primary reaction product. These and other fuel cell technologies can be constructed from material layers singulated and positioned by use of a singulation apparatus and methodology in accordance with the present invention.

In accordance with one application, a singulation apparatus and methodology of the present invention are employed to pick a single fluid transport layer (FTL), such as a gas diffusion layer or diffuse current collector, off the top of a stack of FTLs and place the singulated FTL in an precise location for inclusion within a fuel cell membrane electrode assembly, such as a PEM type MEA. In MEA construction, for example, picking and placing of FTLs needs to be accomplished carefully and precisely. There are typically very tight locational tolerances when constructing an MEA stack (e.g., positional tolerances ranging between about 0.01 inches and about 0.02 inches). FTLs are porous and typically brittle. Use of conventional vacuum techniques to destack an FTL from a magazine of FTLs would result in picking up several FTLs. An apparatus and methodology of the present invention advantageously provides for the singulation of an FTL from a stack of FTLs, and further provides for the placement of singulated FTLs at a preestablished location with high precision.

According to an embodiment of the present invention, one, two, or more adhesive tape pick heads are used in conjunction with a servomotor driven robot to singulate FTLs or other thin porous material layers and to transport individual FTLs to a desired location with high accuracy. The robot is preferably controllable to move the pick heads in horizontal and vertical directions. A horizontal servomotor of the robot employs a rack and pinion system with linear bearing to precisely locate the pick heads in the horizontal direction. A vertical servomotor of the robot employs a ball screw assembly with linear bearing to locate the pick heads in the vertical direction.

Because the product to be handled in accordance with this embodiment is porous and must be picked out of a magazine, an adhesive tape system is employed in the pick head assembly to destack the product. The pick head assembly incorporates wind and unwind mechanisms to index an adhesive tape by a small amount after each pick cycle, thereby maintaining the needed adhesion capability of the pick head assembly. A distance sensor, such as an ultrasonic sensor, is used to determine stack height and the vertical travel needed to engage the adhesive tape with the product. A stripping mechanism, such as stripper feet, is used to separate the product from the adhesive tape at the predetermined destination location.

Due to the brittle nature of the product according to this application, one or more springs are preferably used to counter the weight of the pick heads. A web break sensor detects if the adhesive tape breaks or the unwind mechanism dispenses all of the available adhesive tape. Vacuum is advantageously used at the pick head to stabilize the adhesive tape and prevent the adhesive tape and FTL from moving relative to the pick head. The incorporation of vacuum to control the adhesive tape at the pick head, and therefore maintain precise locational control of the FTL adhered thereto, combined with servomotor positioning of the robot provides for a high precision pick and place apparatus.

Figure 2:
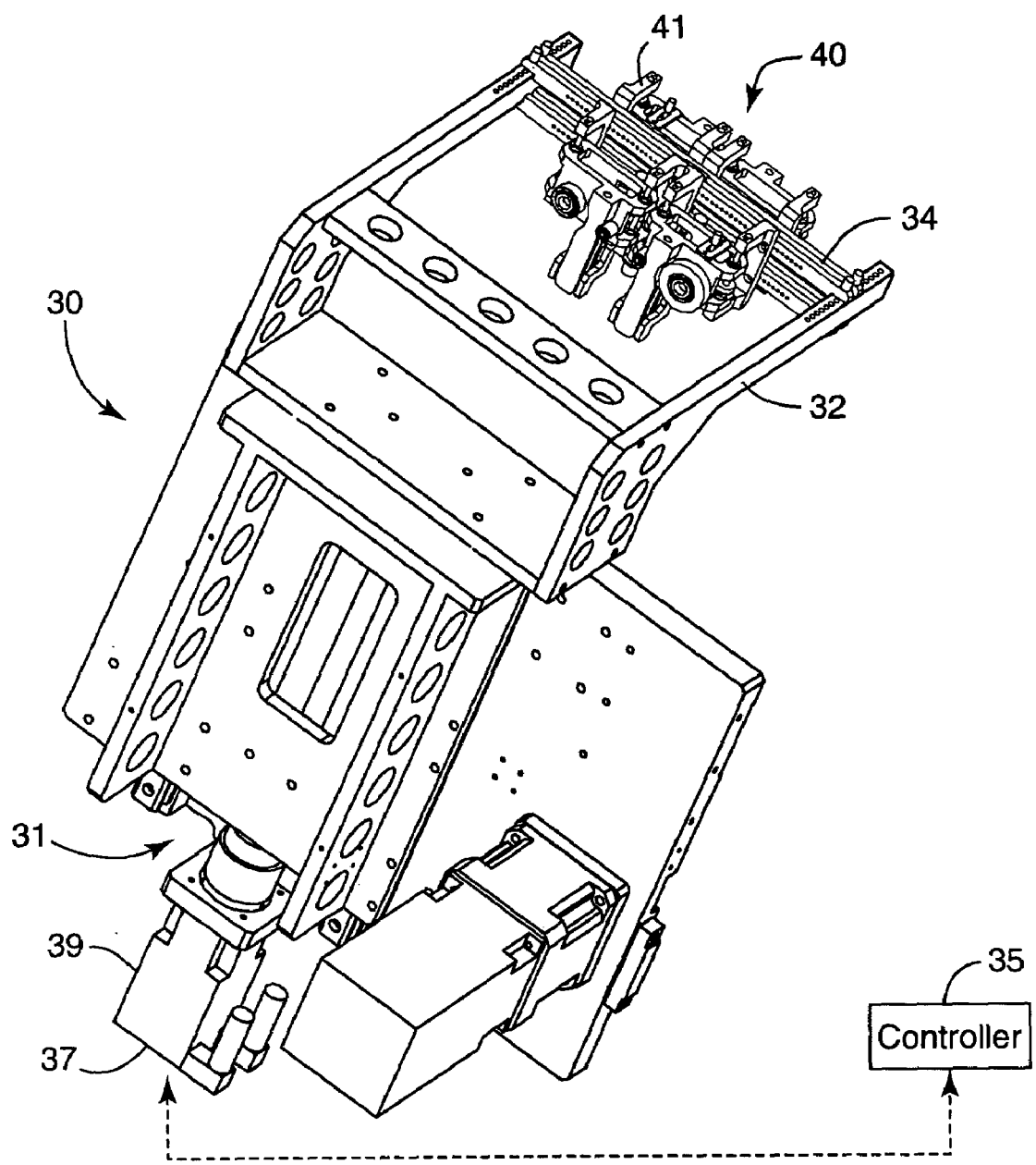
FIG. 2 is a perspective view of a pick head assembly mounted on a robot in accordance with an embodiment of the present invention, the robot controllable to move the pick head assembly vertically and horizontally.

Turning now to FIG. 2, there is illustrated an adhesive tape pick head assembly 40 in accordance with an embodiment of the present invention. According to this embodiment, the pick head assembly 40 comprises two pairs of pick heads for a total of four pick heads that operate in conjunction to pick and place thin porous material layers, such as FTLs, during an automated destacking and placement operation. The pick head assembly 40 is shown mounted via mounts 41 to a support 34 extending from support arms 32 of a robot 30.

Movement of the robot 30, and therefore the pick head assembly 40, is effected by a positioning system 31 under control of a controller 35. Controller 35 is a programmable device, such as a processor, that executes program instructions to coordinate the activities of various elements of the robot 30. The controller 35 may be an on-board device or may be located remotely of the robot 30. If located remotely, the controller 35 is coupled to the robot 30 using an appropriate hardwired or wireless connection.

The positioning system 31 includes a vertical positioning system and a horizontal positioning system. The vertical positioning system includes a vertical servomotor 37 which cooperates with a ball screw assembly (not shown) to controllably move the pick head assembly 40 in the vertical direction. The horizontal positioning system includes a horizontal servomotor 39 which cooperates with a rack and pinion system (not shown) to controllably move the pick head assembly 40 in the horizontal direction.

Figure 3:
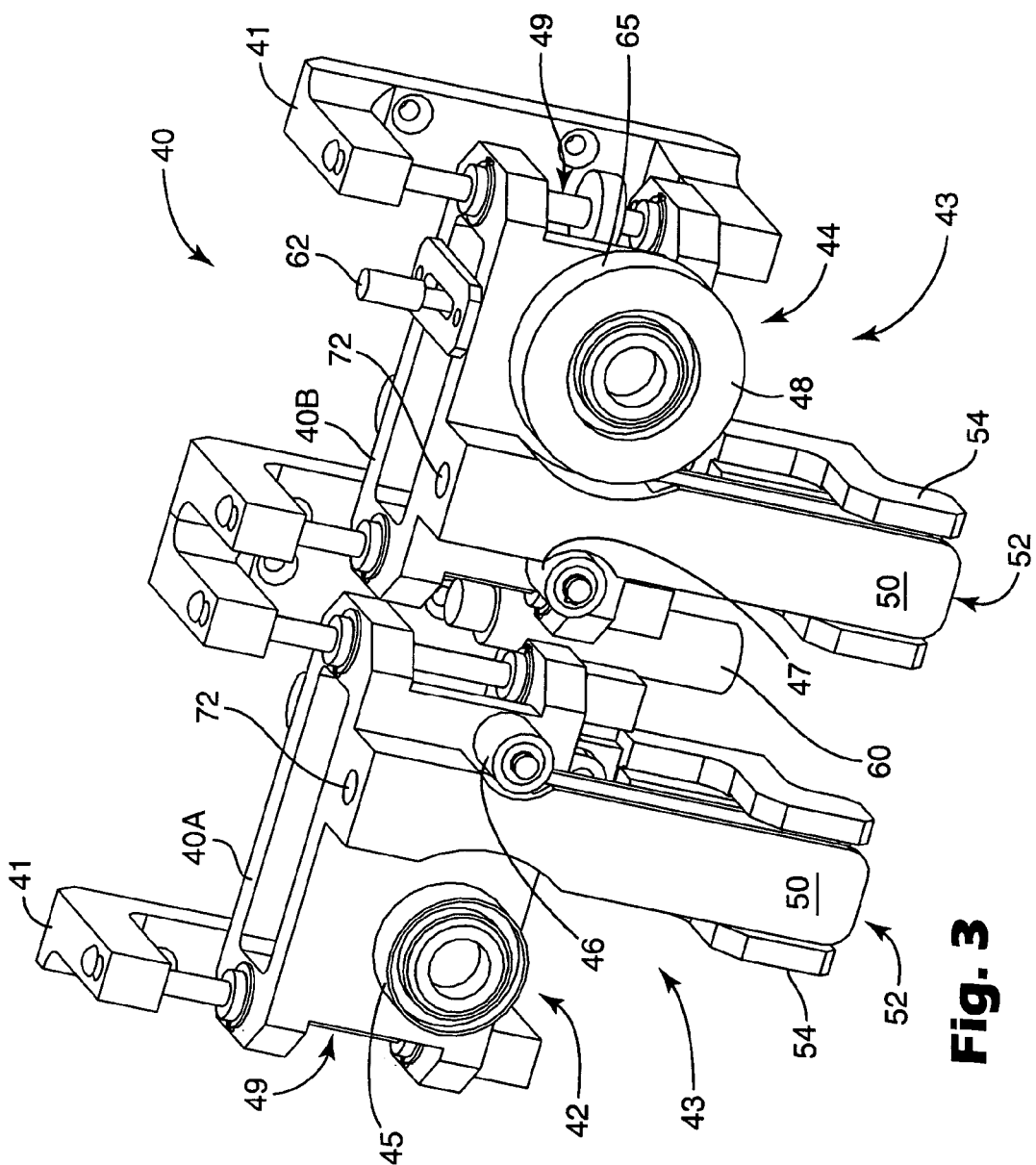
FIG. 3 is a perspective view of a pick head assembly comprising a pair of pick heads and a common tape drive mechanism that presents an adhesive tape across each of the pick heads in accordance with an embodiment of the present invention.

FIG. 3 is a perspective view of a pick head assembly 40 comprising a pair of pick heads 50 and a common tape drive mechanism 43 that advances an adhesive tape 65 across each of the pick heads 50 in accordance with an embodiment of the present invention. As shown in FIG. 3, and as described below, the pick head assembly 40 includes a first pick head assembly 40A and a second pick head assembly 40B. It is understood that a pick head assembly 40 of the present invention may include a single pick head 50 or greater than two pick heads 50. For example, FIG. 2 shows four pick heads 50 arranged on the robot 30 to operate cooperatively.

In the case of pick head assembly 40 in which a single pick head 50 is employed, it is understood that both the unwind and wind-up sections of the tape drive mechanism 43 are typically integrated within the single pick head assembly 40. Moreover, and in accordance with another embodiment, the tape drive mechanism 43 need not be mounted directly to the pick head assembly 40, but may instead be supported by an external support system, such that adhesive tape 65 is fed to the pick head assembly 40 to present fresh adhesive at the pick head 50 for each pickup cycle.

The first pick head assembly 40A and second pick head assembly 40B shown in FIG. 3 each incorporate a pick head 50 which includes a vacuum port 52 at a distal end and an inlet 72 at a proximal end of the pick head 50. A chamber of the pick head 50 extends between the inlet 72 and the vacuum port 52. The inlet 72 is adapted to connect with a vacuum system (not shown) which is controlled to selectively provide a vacuum between the vacuum port 52 situated at a pick region of the pick head 50 and a portion of the adhesive tape 65 moved into proximity with the vacuum port 52.

Stripper feet 54 are situated on each of two sides of the vacuum port 52. The stripper feet 54 are shown in a retracted configuration in FIG. 3, and remain in the retracted configuration until after the product has been picked from the product magazine and moved to its intended destination location. When the pick head 50 is properly positioned at the destination location, the stripper feet 54 are extended beyond a plane of the vacuum port 52, which cause the adhesive tape 65 to separate from the product without disturbing the orientation of the product.

A distance sensor 60 is situated on the pick head assembly 40 and is used to determine the height of the product stack. The distance sensor 60 cooperates with the controller 35 or other processor to compute the vertical travel needed to effect engagement between the adhesive tape 65 presented at the vacuum port 52 and the top product of the product stack. The distance sensor 60 is preferably an ultrasonic sensor, but may also be an optical sensor.

Figure 4A:
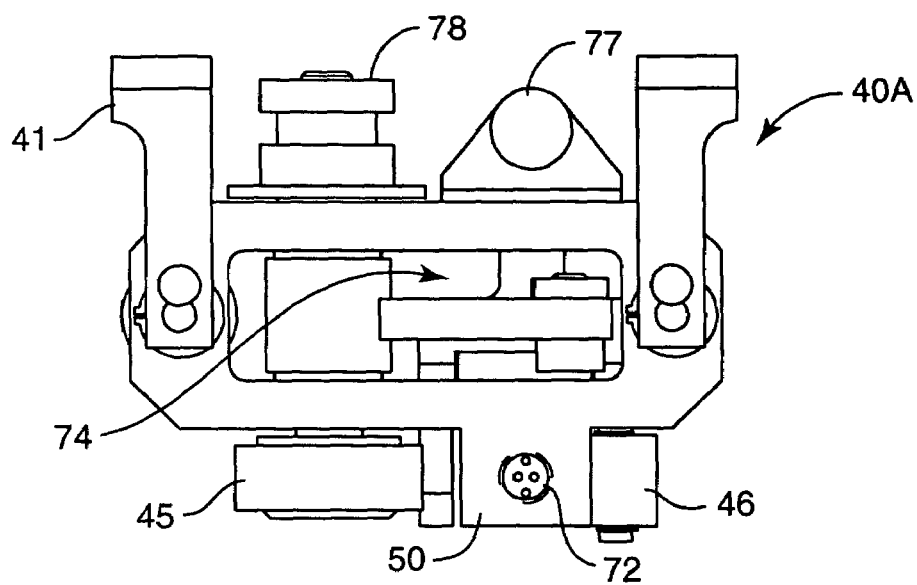
FIG. 4a is a top view of the wind-up mechanism shown in FIG. 3, the view of FIG. 4a showing a portion of a linkage assembly of the wind-up mechanism.
Figure 4B:
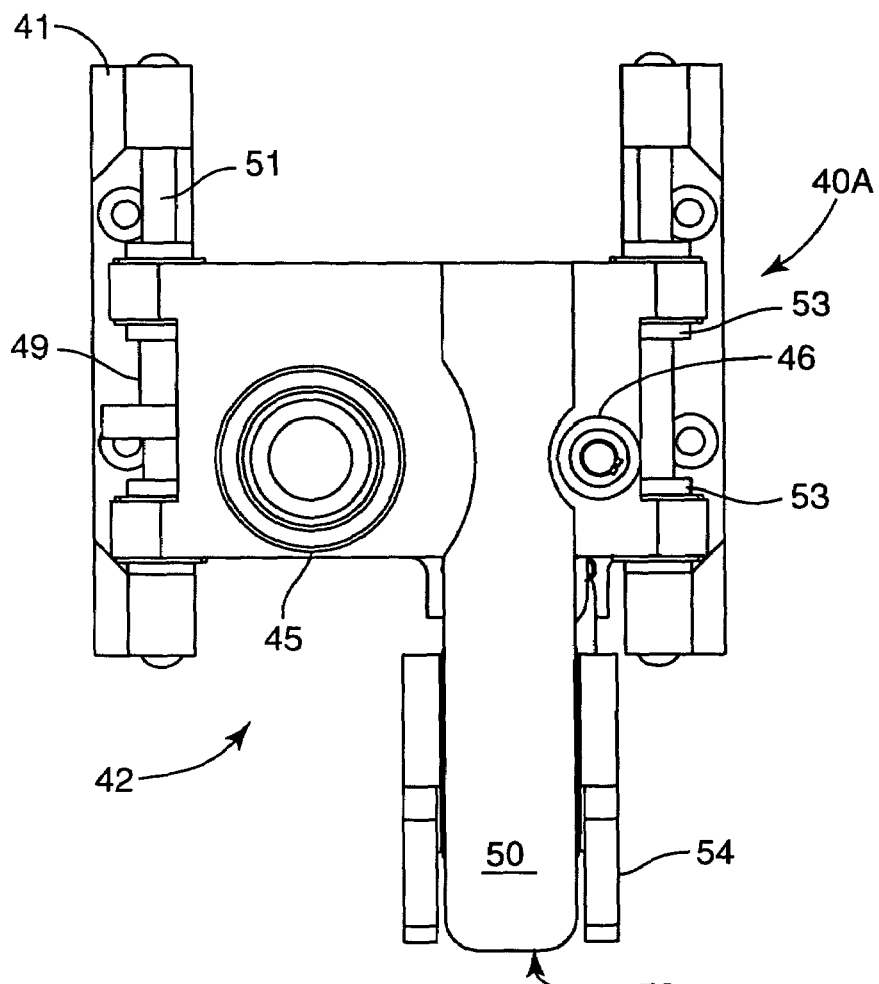
FIG. 4b is a front view of the wind-up mechanism shown in FIG. 3.
Figure 4C:
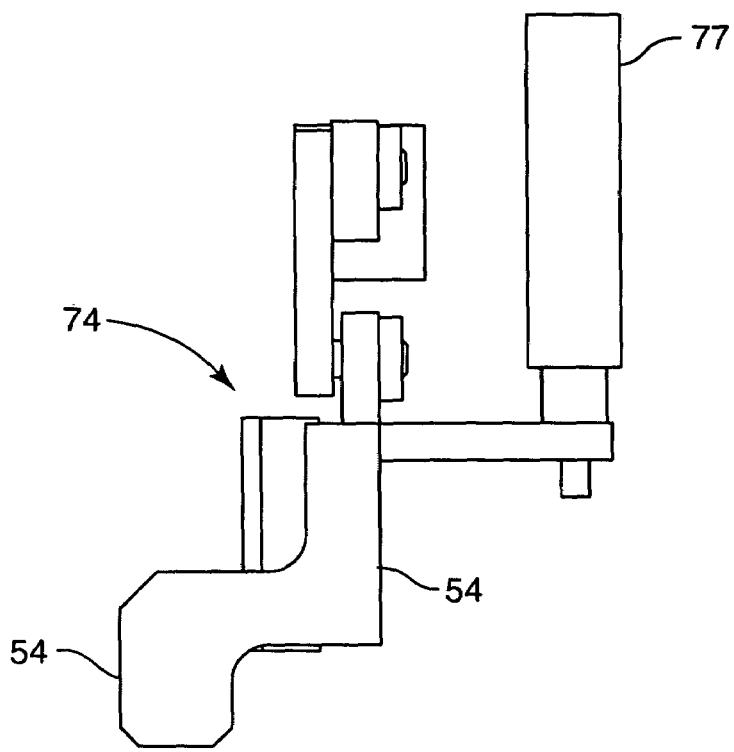
Figure 4D:
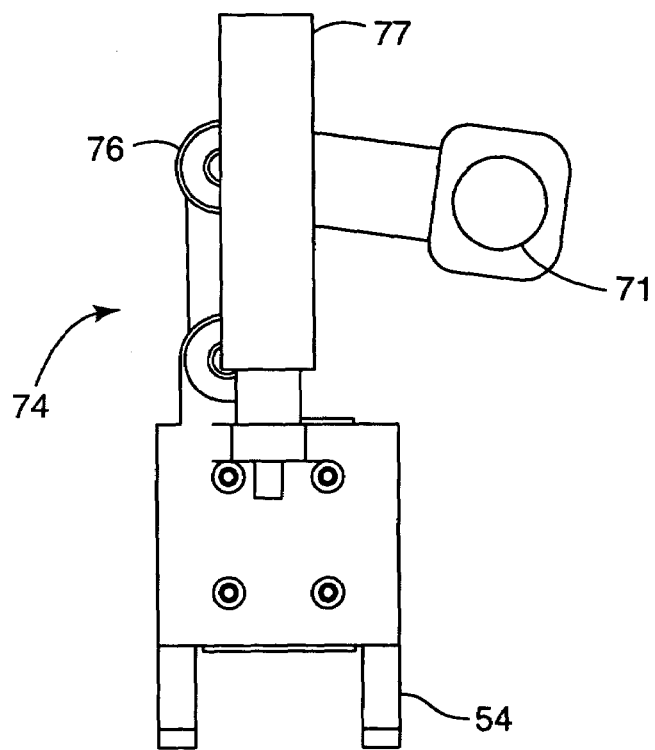

In the embodiment depicted in FIG. 3, the first pick head assembly 40A incorporates a wind-up mechanism 42 and the second pick head assembly 40B incorporates an unwind mechanism 44. The wind-up mechanism 42 of the first pick head assembly 40A shown in FIG. 3 will now be described in greater detail with reference to FIGS. 4a–4d. FIG. 4a is a top view of the first pick head assembly 40A shown in FIG. 3. FIG. 4b is a front view showing of the wind-up mechanism 42 shown in FIG. 3. FIG. 4c is a side view of a linkage assembly 74 partially shown in the top view of FIG. 4a. FIG. 4d is a rear view of the linkage assembly 74 shown in FIG. 4c.

The wind-up mechanism 42 includes a wind-up roll 45 that receives spent adhesive tape 65 fed to the pick head 50 via an idler roll 46. The idler roll 46 of the wind-up mechanism 42, according to this embodiment, receives adhesive tape 65 from an idler roll 47 and unwind roll 48 of the unwind mechanism 44. The wind-up mechanism 42 employs a roller clutch needle bearing 71 which cooperates with a brake 78 to index the adhesive tape 65 in a forward direction from the unwind roll 48 to the wind-up roll 45. A pneumatic cylinder 77 cooperates with a 6-bar linkage 76 to advance the core of the wind-up roll 45. In one configuration, the pneumatic cylinder 77 cooperates with a 6-bar linkage 76 to advance the core of the wind-up roll 45 and concurrently actuates the stripper feet 54 to move to their extended configuration to strip the product off the pick head 50.

As previously discussed, vacuum is applied at the vacuum port 52 via chamber 72 to stabilize the adhesive tape 65 presented proximate the vacuum port 52. Stabilizing the adhesive tape 65 at the pick head 50 when engaging a porous product increases the precision by which such product can be destacked and repositioned.

A spring 49 is employed between a vertical portion of the mount 41 and the first pick head assembly 40A to counter balance the weight of the first pick head assembly 40A. This weight counter balancing mechanism significantly reduces or prevents damage to brittle product, such as fluid transport layers of a fuel cell, when the pick head 50 is brought into contact with the product. The first pick head assembly 40A is compliant vertically, through use of vertical shafts comprising slides 51 and linear bearings 53, to allow for slight over travel of the robot's vertical servomotor 37 to ensure sufficient contact between the pick head 50 and the product.

Figure 5A:
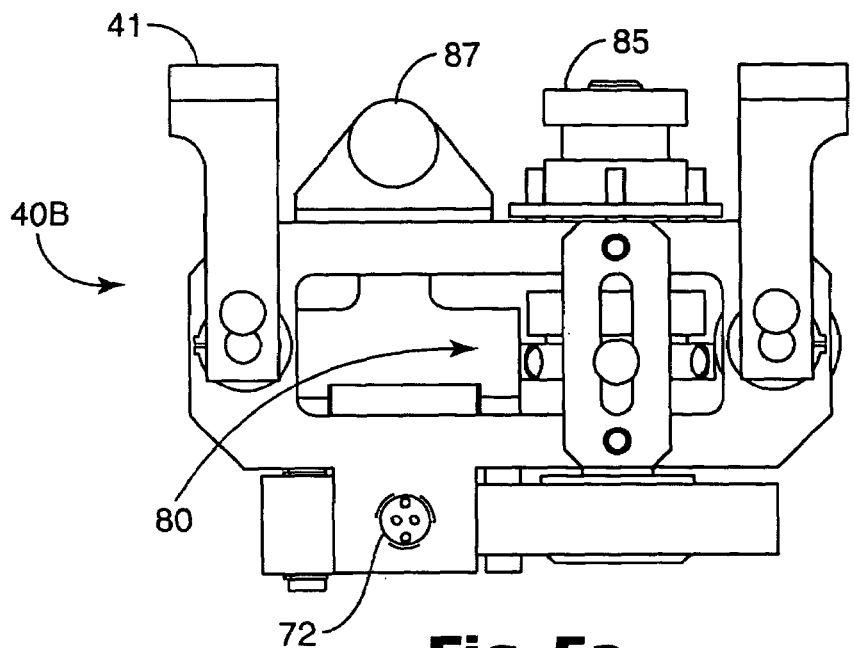
FIG. 5a is a top view of the unwind mechanism shown in FIG. 3, the view of FIG. 5a showing a portion of an unwind assembly of the unwind mechanism.
Figure 5B:
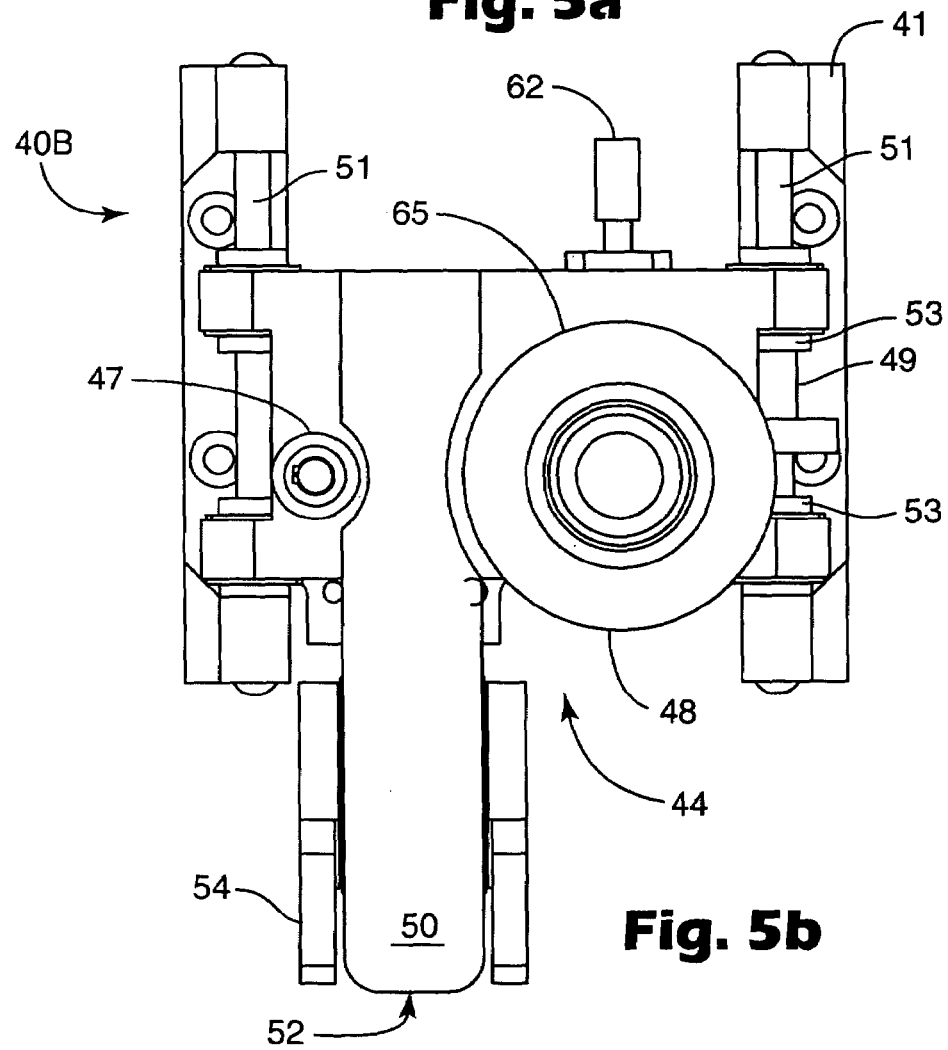
FIG. 5b is a front view of the unwind mechanism shown in FIG. 3.
Figure 5C:
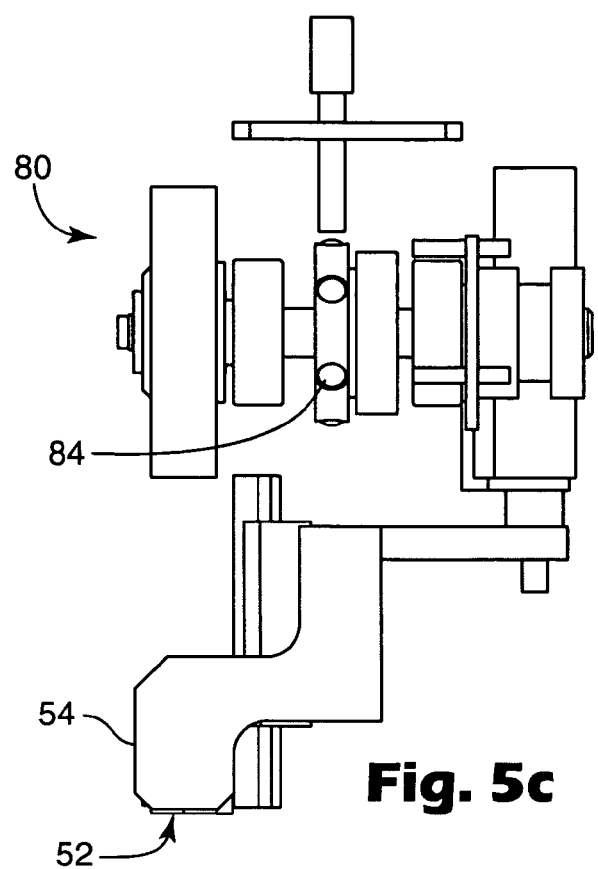
Figure 5D:
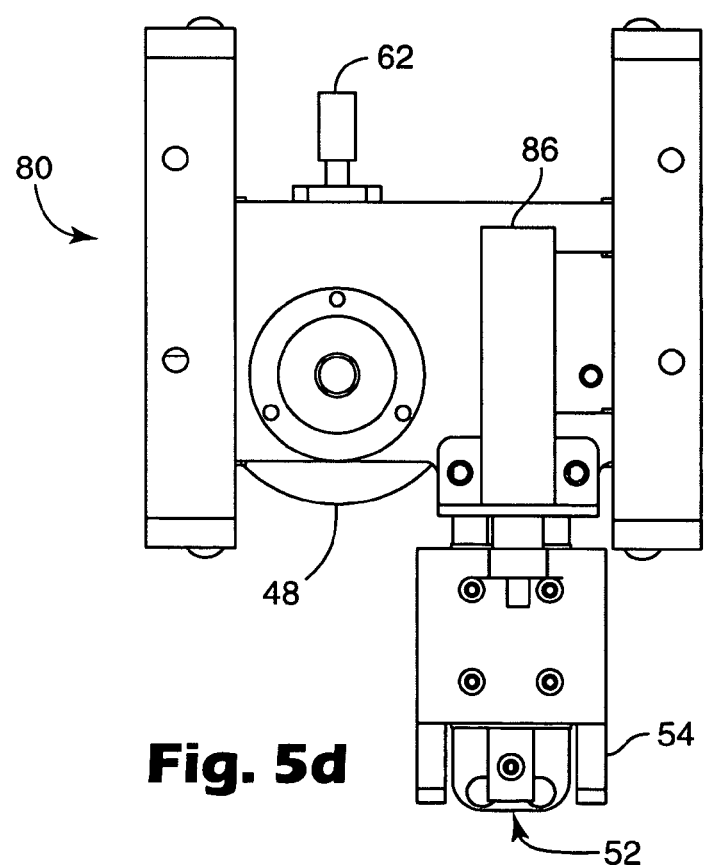

The unwind mechanism 44 of the second pick head assembly 40B shown in FIG. 3 will now be described in greater detail with reference to FIGS. 5a–5d. FIG. 5a is a top view of the second pick head assembly 40B shown in FIG. 3, and provides a partial showing of a portion of an unwind assembly 80 of the unwind mechanism 44. FIG. 5b is a front view of the unwind mechanism 44 shown in FIG. 5a. FIG. 5c is a side view of the unwind assembly 80 partially shown in FIG. 5a. FIG. 5d is a rear view of the unwind assembly 80 shown in FIG. 5c.

The unwind mechanism 44 includes an unwind roll 48 that provides unused adhesive tape 65 to the pick head 50. The partially used adhesive tape 65 advances from the pick head 50, to the idler roll 47, and to the idler roll 46 of the wind-up mechanism 42. The wind-up mechanism 42, according to this embodiment, receives adhesive tape 65 from the idler roll 47 and unwind roll 48 of the unwind mechanism 44.

In one configuration, the length of the adhesive tape 65 between the pick heads 50 of the first and second pick head assemblies 40A, 40B is selected so that sections of the adhesive tape 65 used by the pick head 50 of the first pick head assembly 40A skip past the pick head 50 of the second pick head assembly 40B. In this configuration, fresh adhesive is presented at the vacuum ports 52 of the first and second pick head assemblies 40A, 40B. In another configuration, the adhesive tape 65 employs an adhesive that provides sufficient adhesion for two or more picking cycles, in which case the section of the adhesive tape used by the first pick head 50 is simply advanced for use by each subsequent pick head 50.

The unwind mechanism 44 preferably uses the same vacuum system as the wind-up mechanism 42 to stabilize the adhesive tape 65 via a vacuum at the vacuum port 52 of the pick head 50. The unwind mechanism 44 employs a brake 85 to control the tension in the adhesive tape 65. A pneumatic cylinder 86 is used to extend the stripper feet 54 to strip the product off the pick head 50 when the product reaches its intended destination location.

A tape break detection system is provided at the unwind mechanism 44. In one configuration, a tape sensor 62, which may be a proximity switch operating in cooperation with flags 84, senses when a break occurs in the adhesive tape 65 or when the all of the adhesive tape 65 has been dispensed from the unwind roll 48.

A spring 49 is employed between a vertical portion of the mount 41 and the second pick head assembly 40B to counter balance the weight of the second pick head assembly 40B to prevent damage to brittle product when the pick head 50 is brought into contact with the product. The second pick head assembly 40B is compliant vertically, through use of vertical shafts comprising slides 51 and linear bearings 53, to allow for slight over travel of the robot's vertical servomotor 37 to ensure sufficient contact between the pick head 50 and the product.

A process of singulating an FTL according to an embodiment of the present invention will now be described. It is understood that two to four pick heads 50 are typically employed to pick and place FTLs from an FTL stack to a desired position, although a single pick head may be used. Initially, the pick heads 50 are positioned above a magazine containing a stack of FTLs. At this stage, the stripper feet 54 are retracted and vacuum at the vacuum ports 52 are actively stabilizing adhesive tape 65 against the respective pick heads 50. The distance sensor 60 determines the distance to the top FTL of the stack of FTLs. The vertical servomotor 37 of the robot 30 lowers the pick heads 50 by the determined distance plus a small additional amount to ensure capture of the top FTL by the pick heads 50. As was discussed above, the pick heads 50 have vertical compliance built in to handle over travel.

After the adhesive tape 65 stabilized at the pick region of the respective pick heads 50 engages the top FTL, the vertical servomotor 37 of the robot 30 moves the top FTL upward and the robot's horizontal servomotor 39 moves the top FTL to the desired position. The stripper feet 54 of the respective pick heads 50 are extended to strip the top FTL from the pick heads 50 at the desired position. Extending the stripper feet 54 also rotates the wind-up mechanism's indexing arm back. The vertical servomotor 37 then lifts the pick heads 50 away from the top FTL. The vacuum at the vacuum ports 52 is turned off of the adhesive tape 65, and the stripper feet 54 are retracted. This movement also advances the adhesive tape 65 forward. Vacuum is once again turned on to stabilize the adhesive tape 65, and the horizontal servomotor 39 returns to the magazine in a ready state to handle the next top FTL of the FTL stack.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of singulating a plurality of porous fuel cell fluid transport layers (FTLs) arranged in a stack (FTL stack), the FTL stack comprising a top FTL, the method comprising:
    positioning a pick head above the FTL stack;
    stabilizing an adhesive tape against the pick head through use of a vacuum between the adhesive tape and the pick head;
    effecting contact between the stabilized adhesive tape and the top FTL;
    moving the pick head to move the top FTL from the FTL stack to a predetermined location;
    detaching, while at the predetermined location, the adhesive tape from the top FTL; and
    repeating the positioning, stabilizing, effecting, moving, and detaching processes for subsequent top FTLs.

2. The method of claim 1, further comprising determining a distance between the pick head and the top FTL, wherein effecting contact further comprises moving the pick head by at least the determined distance such that the adhesive tape contacts the top FTL.

3. The method of claim 2, wherein determining the distance comprises ultrasonically determining the distance between the pick head and the top FTL.

4. The method of claim 1, wherein detaching the adhesive tape comprises extending a stripper mechanism of the pick head to effect detachment of the adhesive tape from the top FTL.

5. The method of claim 4, wherein detaching the adhesive tape further comprises retracting the stripper mechanism after detaching the adhesive tape from the top FTL.

6. The method of claim 1, further comprising advancing the adhesive tape to present unused adhesive proximate the pick head after detaching the adhesive tape from the top FTL.

7. The method of claim 6, further comprising removing the vacuum between the adhesive tape and the pick head after detaching the adhesive tape from the top FTL and prior to advancing the adhesive tape.

8. The method of claim 1, wherein the FTL stack is stationary, and effecting contact comprises moving the pick head so that the adhesive tape contacts the top FTL.

9. The method of claim 1, wherein effecting contact comprises displacing the pick head vertically so that the adhesive tape contacts the top FTL, and moving the pick head comprises moving the pick head horizontally to move the top FTL to the predetermined location.

10. The method of claim 1, further comprising detecting presence or absence of the adhesive tape at the pick head.

11. The method of claim 1, wherein detaching the adhesive tape from the top FTL comprises detaching the adhesive tape from the top FTL at the predetermined location with a positional tolerance ranging between about 0.01 inches and about 0.02 inches.

12. A method of singulating a plurality of thin and substantially porous material layers arranged in a stack, the stack of material layers comprising a top material layer, the method comprising:
    positioning a pick head above the stack of material layers;
    stabilizing an adhesive tape against the pick head through use of a vacuum between the adhesive tape and the pick head;
    effecting contact between the stabilized adhesive tape and the top material layer;
    moving the pick head to move the top material layer from the stack to a predetermined location;
    detaching, while at the predetermined location, the adhesive tape from the top material layer; and
    repeating the positioning, stabilizing, effecting, moving, and detaching processes for subsequent top material layers.

13. The method of claim 12, further comprising determining a distance between the pick head and the top material layer, wherein effecting contact further comprises moving the pick head by at least the determined distance such that the adhesive tape contacts the top material layer.

14. The method of claim 13, wherein determining the distance comprises ultrasonically determining the distance between the pick head and the top material layer.

15. The method of claim 12, wherein detaching the adhesive tape comprises extending a stripper mechanism of the pick head to effect detachment of the adhesive tape from the top material layer.

16. The method of claim 15, wherein detaching the adhesive tape further comprises retracting the stripper mechanism after detaching the adhesive tape from the top material layer.

17. The method of claim 12, further comprising advancing the adhesive tape to present unused adhesive proximate the pick head after detaching the adhesive tape from the top material layer.

18. The method of claim 17, further comprising removing the vacuum between the adhesive tape and the pick head after detaching the adhesive tape from the top material layer and prior to advancing the adhesive tape.

19. The method of claim 12, wherein the stack of material layers is stationary, and effecting contact comprises moving the pick head so that the adhesive tape contacts the top material layer.

20. The method of claim 12, wherein effecting contact comprises displacing the pick head vertically so that the adhesive tape contacts the top material layer, and moving the pick head comprises moving the pick head horizontally to move the top material layer to the predetermined location.

21. The method of claim 12, further comprising detecting presence or absence of the adhesive tape at the pick head.

22. The method of claim 12, wherein detaching the adhesive tape from the top material layer comprises detaching the adhesive tape from the top material layer at the predetermined location with a positional tolerance ranging between about 0.01 inches and about 0.02 inches.

* * * * *